(12) United States Patent
Powell et al.

(10) Patent No.: US 8,662,441 B2
(45) Date of Patent: Mar. 4, 2014

(54) UNMANNED AERIAL VEHICLE LAUNCH SYSTEM

(75) Inventors: David Powell, Sanford, FL (US); Earl Mark, Deland, FL (US); John T. Houck, Ormond Beach, FL (US); Keith Huber, Palm Coast, FL (US)

(73) Assignee: Sparton Corporation, Schaumburg, IL (US)

( * ) Notice: Subject to any disclaimer, the term of this patent is extended or adjusted under 35 U.S.C. 154(b) by 260 days.

(21) Appl. No.: 13/367,494

(22) Filed: Feb. 7, 2012

(65) Prior Publication Data
US 2012/0205488 A1 Aug. 16, 2012

Related U.S. Application Data

(60) Provisional application No. 61/443,310, filed on Feb. 16, 2011.

(51) Int. Cl.
 *B64F 1/10* (2006.01)
(52) U.S. Cl.
 USPC ............... 244/63; 244/62; 244/73 R; 244/74; 89/1.809; 89/1.81
(58) Field of Classification Search
 USPC .......... 244/62, 63, 73 R, 74, 171.3; 89/1.809, 89/1.81
 See application file for complete search history.

(56) References Cited

U.S. PATENT DOCUMENTS

| | | | |
|---|---|---|---|
| 6,056,237 A | 5/2000 | Woodland | |
| 6,286,410 B1 * | 9/2001 | Leibolt | 89/1.809 |
| 6,409,122 B1 | 6/2002 | Nicolai | |
| 6,779,463 B2 | 8/2004 | Mutascio et al. | |
| 6,820,840 B2 | 11/2004 | Lund et al. | |
| 7,410,122 B2 | 8/2008 | Robbins et al. | |
| 7,556,219 B2 | 7/2009 | Page et al. | |
| 7,739,938 B2 | 6/2010 | Nair et al. | |
| 8,056,461 B2 | 11/2011 | Bossert et al. | |
| 8,115,149 B1 * | 2/2012 | Manole et al. | 244/3.14 |
| 2005/0230535 A1 | 10/2005 | Ruszkowski, Jr. | |
| 2011/0226174 A1 * | 9/2011 | Parks | 114/313 |

OTHER PUBLICATIONS http://www.aviationweek.com/aw/blogs/defense/index.jsp?plckController=Blog&plckScript=blogScript&plckElementId=blogDest&plckBlogPage=BlogViewPost&plckPostId=Blog:27ec4a53-dcc8-42d0-bd3a-01329aef79a7Post:6d40c1f5-3b78-46c0-a012-0a2b0c7ca55a, "US Plans Sub-Launched UAV Test"; by Graham Warwick Jul. 17, 2010.

(Continued)

*Primary Examiner* — Timothy D Collins
*Assistant Examiner* — Nicholas McFall
(74) *Attorney, Agent, or Firm* — Quinn Law Group, PLLC

(57) ABSTRACT

A system for launching an unmanned aerial vehicle (UAV) payload includes a launch tube, liquid rocket, and launch control assembly. The rocket is positioned in the launch tube and contains the UAV payload. A booster assembly may include a canister partially filled with liquid. A gas cylinder is filled with compressed gas. The liquid is pre-pressurized by the gas or mixed with the gas right before launch such that, upon launch, liquid and gaseous thrust stages launch the rocket to a threshold altitude. The UAV payload deploys after reaching the threshold altitude. Optional stability tubes may be connected to the launch tube, which may be buoyant for water-based operations. An optional tether may be connected to the liquid rocket for arresting its flight prior to reaching apogee. The UAV payload is not launched directly by the gas/liquid mix. A method of launching the UAV payload is also disclosed.

20 Claims, 3 Drawing Sheets

(56) References Cited

OTHER PUBLICATIONS http://www.northropgrumman.com/news/es/2005/01/70540.html; Northrop Grumman Encapsulation Technology Enables New Submarine Capability; Jan. 10, 2005.
http://www.theregister.co.uk/2008/07/10/german_submarine_uav/; "Germans develop submarine-launched UAV Above us the drones"; by Lewis Page Jul. 10, 2008.
http://defensesystems.com/articles/2008/08/navy-test-uav-launched-from-tube.aspx?p=1; Navy begins test of tube-launched UAV: by David F. Carr Aug. 11, 2008.
http://investor.raytheon.com/phoenix.zhtml?c=841934=irol-newsArticle&ID=1217056&highlight=; "Raytheon, U.S. Navy Demonstrate Unmanned Aircraft System Capability for Submarines"; News Release Oct. 24, 2008.
http://www.seacorp.com/products-services/product-rd/inflator-based-uav-launchers.html; "Inflator-Based UAV Launchers".

\* cited by examiner

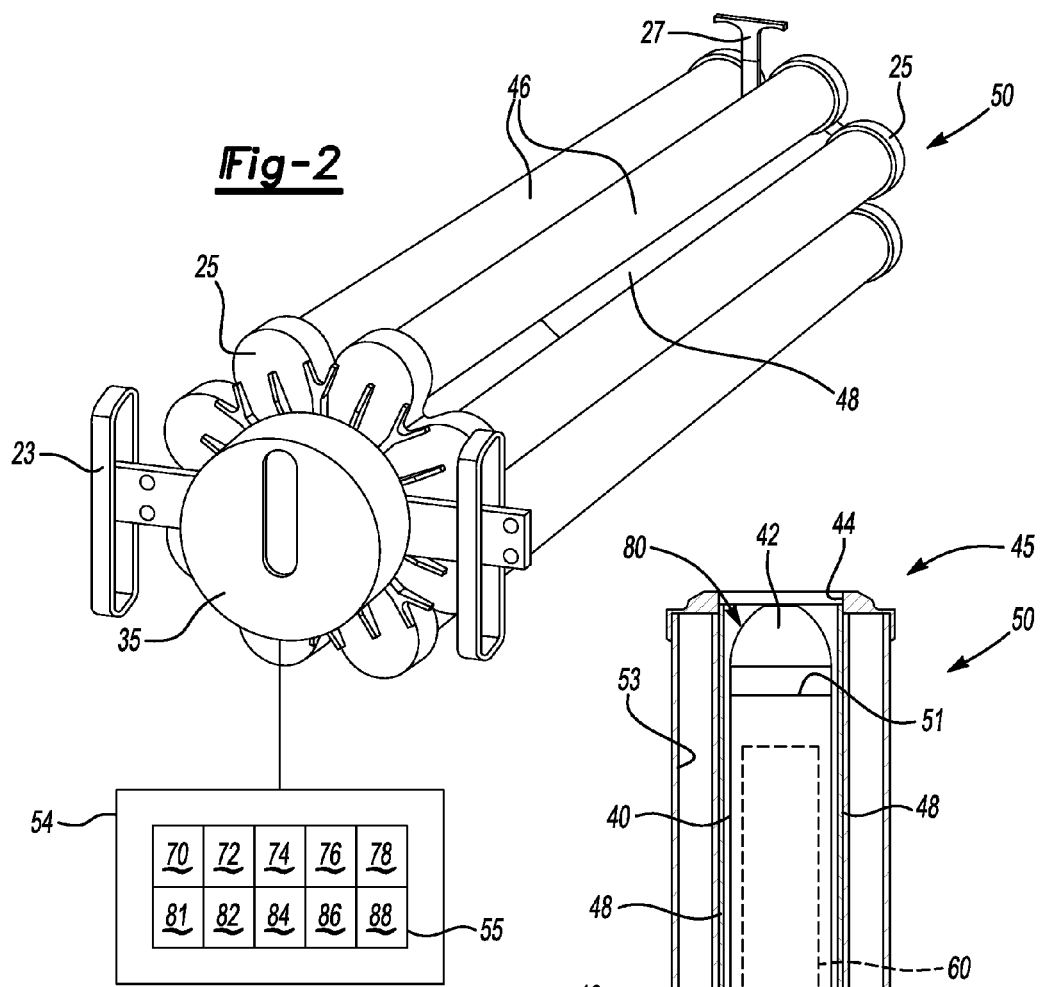
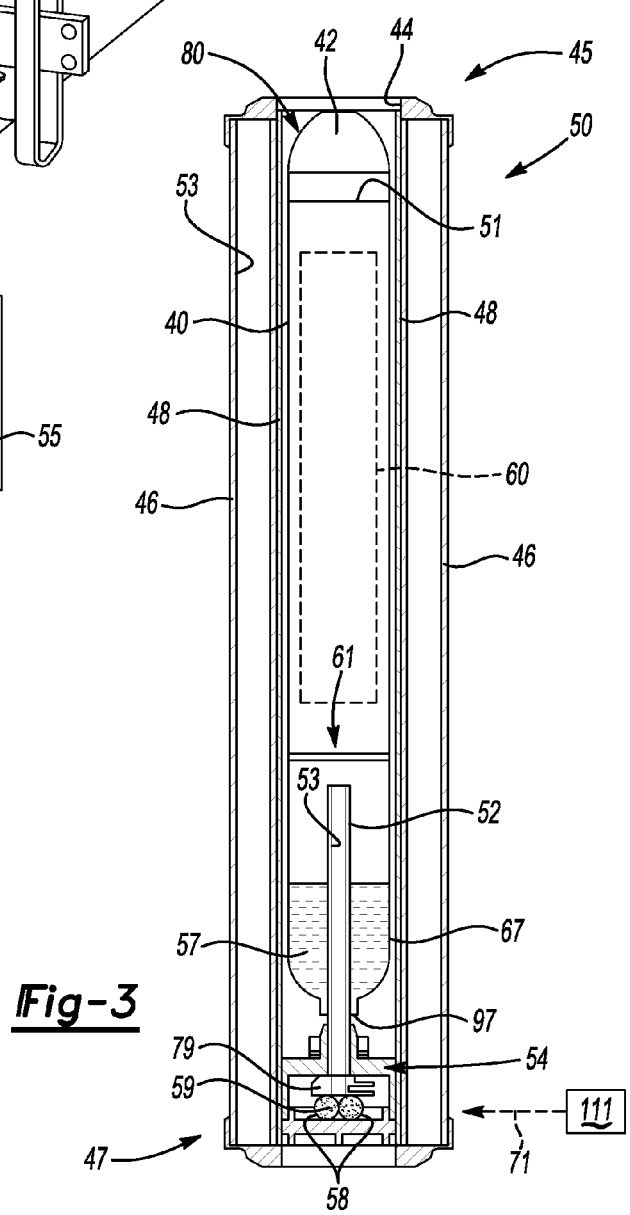

UNMANNED AERIAL VEHICLE LAUNCH SYSTEM

CROSS-REFERENCE TO RELATED APPLICATIONS

This application claims the benefit of U.S. Provisional Patent Application No. 61/443,310 filed on Feb. 16, 2011, which is hereby incorporated by reference in its entirety.

TECHNICAL FIELD

The present disclosure relates to a system for launching an unmanned aerial vehicle (UAV).

BACKGROUND

Unmanned aerial vehicles (UAVs) are remotely or autonomously controlled aircraft. UAVs are characterized by an absence of a human pilot controlling the aircraft from within a cockpit in the conventional manner, although a pilot may remotely control the UAV using a ground-to-air radio link. The Federal Aviation Administration (FAA) has adopted the term "Unmanned Aircraft System" to collectively refer to the UAV and its ground station and any other support equipment that is instrumental to successful UAV flight operations.

UAVs/UASs are traditionally used in support of intelligence, surveillance, and reconnaissance (ISR) missions. However, the traditional ISR support role has evolved from the earliest radio-controlled drones to the highly sophisticated systems used on the modern battlefield. For instance, mission scope has expanded to include strike missions, using airborne UAVs as communications relay nodes, search and rescue (SAR) operations, and suppression/destruction of enemy air defense (SEAD/DEAD).

While large conventional UAVs continue to provide valuable ISR and strike support, efforts are underway for deploying smaller UAVs. UAVs of reduced size may be particularly useful when deployed from a forward area of operation. Such areas of operation typically lack an extended runway surface and other infrastructure needed for launching and controlling a large conventional UAV. Small UAVs may also be useful in areas having overhead obstacles preventing conventional runway takeoff. However, small UAVs also may pose unique launch and deployment challenges.

SUMMARY

A launch system is disclosed herein for an Unmanned Aerial Vehicle (UAV). The launch system may include a launch tube, a liquid rocket having a body and a booster assembly, and a launch control assembly. The body contains a stowed UAV platform, e.g., a small airplane with wings which unfold or unwrap with respect to a fuselage when the UAV payload is deployed from the body of the liquid rocket at altitude. The liquid rocket is launched from the launch tube to a threshold altitude using pressure generated in a canister of the booster assembly from a calibrated mixture of a compressed gas and liquid. The UAV platform does not deploy from the rocket body until it as at a threshold altitude, unlike launch devices which launch the UAV payload directly. That is, the liquid rocket first carries the UAV payload to the threshold altitude before deploying the UAV payload from the body, and thus protects the UAV platform from launch forces and other concerns that affect the prior art, e.g., wave height/frequency in a sea-launched variant as described herein.

The number of available systems and methodologies for launching small UAVs from surfaces or launch platforms lacking a conventional runway surface are presently limited. Those that do exist typically utilize pyrotechnic, catapult, or air-cannon type devices to launch the UAV payload itself from a launch pad. The UAV payload must be structured to handle extreme launch forces, and also must deploy almost immediately upon launch. Such systems can unduly stress the airframe of the UAV while potentially posing safety issues in certain applications. This result is largely due to the relatively extreme forces of acceleration needed to achieve an exit velocity sufficient for achieving a successful transition to flight. Moreover, the level of recoil generated by conventional systems can be extreme. In some launch sequences the recoil may disrupt or capsize the launch platform.

The present approach solves these problems using the liquid rocket noted above to carry the UAV payload to altitude before deploying it and transitioning to flight. The booster assembly may define separate volumes of an inert liquid such as water and an inert compressed gas such as $CO_2$, $N_2$, or air. In some embodiments, the liquid and compressed gas may be pre-mixed at a predetermined point in time, such as after deployment of the launch system or prior to installation of the launch system, e.g., into a trash disposal unit (TDU) in a submarine-launched application. In such an embodiment, a release/trigger mechanism can be actuated remotely to allow the booster assembly to launch.

The booster assembly provides extended liquid and gaseous thrust phases at levels sufficient for launching the liquid rocket with the UAV payload contained therein. The liquid rocket and the UAV payload are therefore launched with closely controlled forces of acceleration, and with substantially lower levels of recoil relative to conventional pyrotechnic launch systems, as well as other systems such as catapults. The liquid rocket also allows the UAV payload to be deployed at higher altitudes, thus reducing initial power consumption by the UAV payload and enabling extended range or flight duration.

The present launch system includes a launch tube. Depending in the embodiment, the launch tube may be optionally surrounded by stabilizing tubes, which in turn may be buoyant in a water-launched application. A launch control assembly is positioned with respect to the launch tube, and selectively generates a launch signal which, upon receipt, releases pressure from the canister to launch the liquid rocket. The liquid and compressed gas is discharged in different thrust stages to propel the rocket to the threshold altitude whereupon the UAV payload is deployed from the cylindrical body.

Another launch system includes a launch tube, buoyancy tubes arranged with respect to the launch tube, and a liquid rocket. The buoyancy tubes float the launch tube on a surface of a body of water. The cylindrical body is positioned in the launch tube prior to launch. A booster assembly is connected to the cylindrical body, and includes a canister containing liquid water, a supply of a compressed gas, and a UAV payload. The UAV payload is disposed within the cylindrical body and is configured to deploy from an end of the cylindrical body when the liquid rocket reaches a threshold altitude.

A method of launching a UAV payload includes providing a liquid rocket having a cylindrical body containing a UAV payload and a booster assembly connected to the body, wherein the booster assembly includes a canister that is filled with liquid to a calibrated level. The method also includes positioning the liquid rocket in a stabilized launch tube of a launch system, deploying the launch system into a body of water, and floating the launch system on the surface of the body of water. The method further includes releasing compressed gas into the canister above the calibrated level of the liquid, opening a nozzle of the liquid rocket when a threshold pressure has built in the canister to thereby launch the liquid rocket to a threshold altitude using both liquid and gaseous thrust, and ejecting the UAV payload from the cylindrical body at the threshold altitude.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is schematic perspective view illustration of a submarine-launched variant of the present launch system which can be deployed according to the example sequence shown in FIG. 1.

FIG. 3 is a schematic partial cross-sectional side view illustration of the launch system shown in FIG. 1, and containing both a liquid rocket and a UAV payload.

DESCRIPTION

Figure 1:
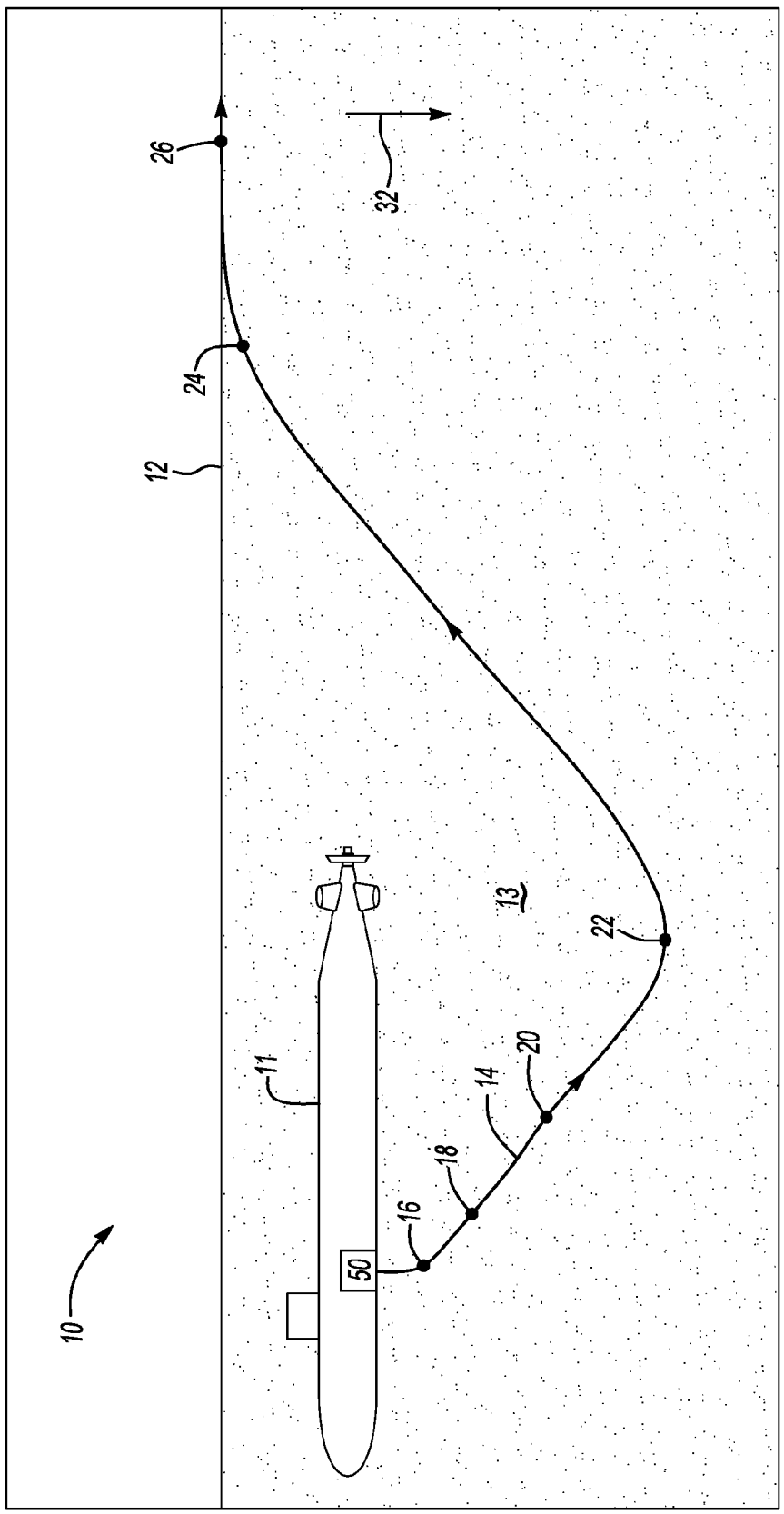
FIG. 1 is a schematic illustration of an example sequence for deploying the present launch system for an Unmanned Aerial Vehicle (UAV).
Figure 5:
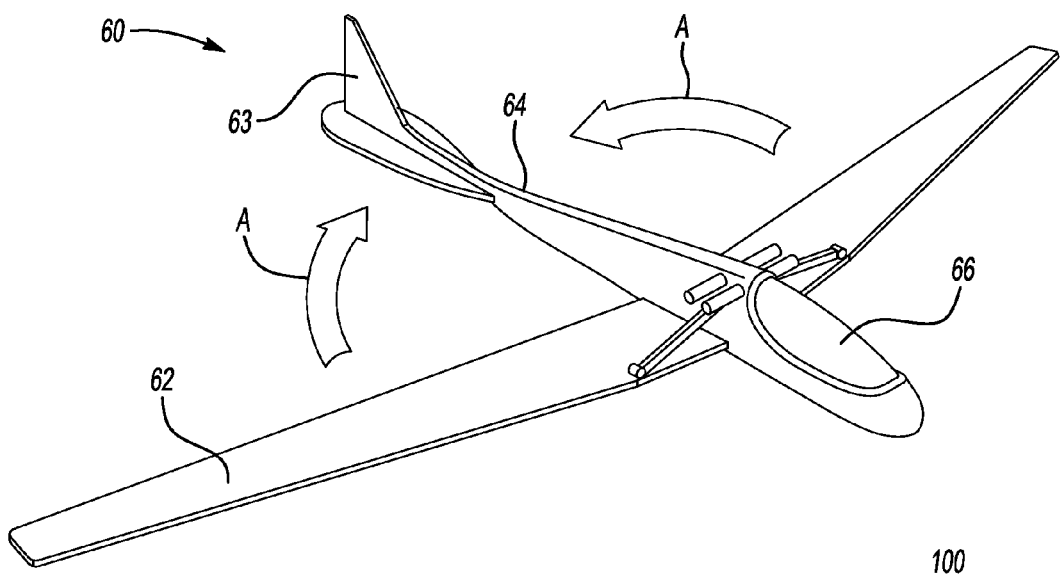
FIG. 5 is a schematic perspective side view illustration of an example UAV payload which may be deployed from the liquid rocket shown in FIG. 4.

Referring to the drawings, wherein like reference numbers correspond to like or similar components throughout the several figures, an example deployment sequence 10 is shown in FIG. 1 for deploying and ultimately launching an Unmanned Aerial Vehicle (UAV) payload 60, an example of which is shown in FIG. 5 and explained below. As used herein, the term "UAV payload" refers to a pilotless aircraft such as an airplane which is either autonomously or remotely controlled after launch. The sequence 10 of FIG. 1 describes just one possible deployment of a launch system 50 containing the UAV payload 60 of FIG. 5 therein, i.e., a deployment from a submerged submarine 11.

However, in other embodiments the present launch system 50 can be deployed according to other sequences, including but not limited to being dropped or ejected from a moving helicopter, airplane, other aircraft, or over the side of a surface vessel, or by being manually positioned by a human operator on the ground or in the water, e.g., when operating from a remote forward or mobile operating base. Necessary variations from the deployment sequence 10 shown in FIG. 1 in such alternative embodiments will be evident to those of ordinary skill in the art, and are also noted below.

The present launch system 50 in all of its embodiments operates using controlled liquid and gaseous thrust from a booster assembly of a liquid rocket, which as recognized herein provides significantly lower acceleration forces and recoil relative to, for instance, conventional pyrotechnic, catapult, and air cannon type launch methods. Existing launch devices generate tremendous force and can achieve a relatively high apogee. However, higher acceleration produces increased gravitational/G forces. Higher G forces can easily damage small and relatively fragile UAV airframes.

Figure 4:
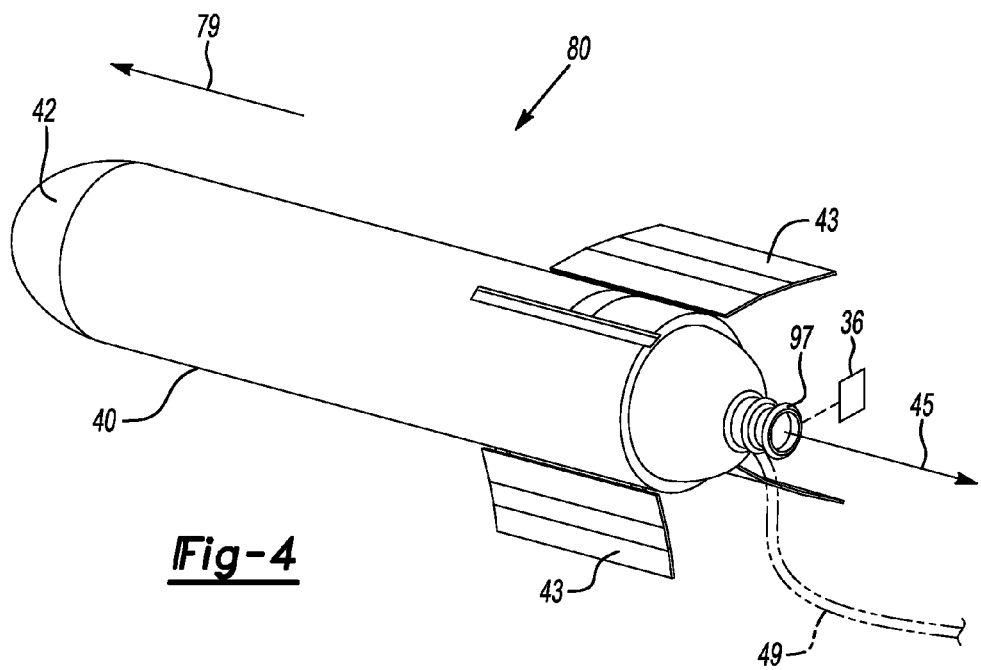
FIG. 4 is a schematic perspective side view illustration of an example liquid rocket for use in launching a UAV payload.

Additionally, the high exit velocities of any UAV payload that is not contained in a suitable payload enclosure, such as the present liquid rocket 80 of FIG. 4, can result in the wings of the UAV payload being damaged as the payload exits the launch tube, catapult, or other launcher. The liquid rocket 80 shown in FIG. 4 thus allows the wings of a UAV payload, e.g., the wings 62 of the example UAV payload 60 shown in FIG. 5, to deploy under controlled conditions.

For instance, impulse-type air cannon designs limit payload acceleration duration to the length of the launch tube. Pyrotechnic devices such as airbag inflators may not be desirable due to the high G-loads acting on the payload, as well as the limited control of such a deployment mechanism. Using compressed air or gas alone directly on the UAV platform can damage the UAV platform and pose other launch control problems, e.g., launching directly into an oncoming wave. Additionally, conventional launch methodologies can generate significant recoil relative to the present liquid rocket approach. On land, the latter concern may not be particularly problematic. However, when launching from the surface 12 of a body of water 13 as shown in FIG. 1, high levels of recoil can cause the launch pad to sink or capsize, particularly in high seas, and thus can disrupt the launch.

Still referring to FIG. 1, in the example launch sequence 10 the submarine 11 is submerged below the surface 12. The launch system 50 may be ejected from a suitable hatch of the submarine 11, e.g., a trash disposal unit (TDU) of the type used for jettisoning compressed trash while submerged, as is well known in the art, or from a missile tube or any other suitable hatch. Land-based alternative launch sequences may be readily envisioned using variations of the launch system 50 and launch sequence 10, e.g., a portable shoulder/backpack system which may be carried into remote locations by infantry or special forces units operating a considerable distance from the nearest conventional runway, or in areas with overhead obstacles such as a heavy tree canopy. Such alternative configurations may forego the various sea launch design features explained here and also below with reference to FIG. 2.

In the TDU-deployed embodiment shown in FIG. 1, the launch system 50 may be ejected from the submarine 11 into the body of water 13 while the submarine 11 is traveling at a calibrated speed and depth, for example approximately 1-3 knots at a depth of approximately 18-60 meters. A trajectory (arrow 14) of the launch system 50 describes the relative path of travel of the launch system 50 between its ejection from the submarine 11 and a point of stabilization (point 26) on the surface 12. As will be understood by those of ordinary skill in the art, the path is "relative" in the sense that the submarine 11 is actually moving laterally in FIG. 1 and the launch system 50 is moving primarily downward and then upward again with respect to the surface 12, as opposed to traveling via the trajectory (arrow 14) as shown in FIG. 1 relative to a stationary submarine 11.

At approximately point 16 of the trajectory (arrow 14), the launch system 50 descends at a controlled rate. The controlled descent may be provided in part using calibrated primary and secondary ballast devices (not shown), for instance steel weights, sandbags, etc. The launch system 50 begins to rotate into a vertical orientation at approximately point 18. At this point the primary ballast may be separated and jettisoned from the launch system 50, such as by using a depth and/or time-activated switch, by cutting a lanyard, or using any other suitable means.

At approximately point 20 of the trajectory (arrow 14), the launch system 50 of FIG. 1 continues to descend at a controlled rate, e.g., approximately 0.5 meters per second (mps) in one possible embodiment. At a calibrated depth and time, or at approximately point 22 of the trajectory (arrow 14), the secondary ballast is released from the launch system 50, for instance using a depth and/or time-activated switch, by cutting a lanyard, etc. The launch system 50 thereafter becomes positively buoyant. Such positive buoyancy may be provided using stability tubes 46, examples of which are shown in detail in FIGS. 2 and 3. Buoyancy may also be achieved if the launch tube 48 displaces a sufficient volume of water. The maximum depth of the trajectory (arrow 14) at point 22 may be approximately 185 m in a particular embodiment, although other depths may be used depending on the speed and depth of the submarine 11.

Beginning at point 22, the launch system 50 begins its ascent toward the surface 12 at a controlled rate, for instance approximately 1.25 mps. The launch system 50 reaches and ultimately breaches the surface 12 at about point 24, and thereafter stabilizes using any suitable stabilization means (not shown), e.g., floats, rocker arms, etc. Such means may include appropriate separation of center of buoyancy and center of gravity to make a spar buoy configuration, as is well understood in the art, for instance a weight on a rigid arm that is lowered beneath the launch system 50.

Naturally, the deployment steps shown in FIG. 1 up to and including point 24 would not be required in a land-based deployment embodiment. Alternative air-deployed embodiments, for instance dropping the launch system 50 from an aircraft, may differ only in the platform from which the launch system 50 is ejected, e.g., from an open door of the aircraft rather than from a TDU hatch. Under these circumstances, the launch system 50 will ultimately stabilize on the surface 12 at point 26.

For any sea-deployed embodiment, the structure of the launch system 50 remaining on the surface 12 after launch may be optionally scuttled, which is indicated in FIG. 1 by arrow 32. At point 26 of any of the possible sea and land deployment embodiments, a liquid rocket 80 (see FIGS. 3 and 4) is then launched from the launch system 50 using a calibrated mixture of compressed gas and liquid. The structure of the launch system 50 configured for such a launch will now be described with reference to the remaining Figures.

Referring to FIG. 2, one possible embodiment of the present launch system 50 is the TDU-compatible design noted above. In such a design, the launch system 50 may be configured as a modified sonobuoy deployment system, for instance having a length of less than approximately 42" and a dry weight of less than approximately 22 kilograms (kg), and less than approximately 23.1 kg with an optional safety bar 27 as described below. Such a size is compatible with an A-size sonobuoy of the type known in the art. However, the launch system 50 can be scaled as large or small as is needed for the particular application.

Optional stability tubes 46 may be arrayed in a ring in one possible embodiment so as to surround a single inner launch tube 48. When used in a sea-launched application the stability tubes 46 may be configured with an appropriate shape, size, and density to allow the launch system 50 to ascend toward the surface 12 of FIG. 1 at a controlled rate. Thus, tubes 46 are buoyant in some embodiments. The launch tube 48 also serves as a buoyancy element in this particular configuration.

Each end of the stability tubes 46 may be capped with a removable end cap 25, thus rendering the stability tubes 46 sufficiently water tight until launch. Each of the end caps 25 may have a scalloped or fluted design as shown to facilitate axial flow of water with respect to the longitudinal axis of the stability tubes 46 as the launch system 50 moves through the body of water 13 shown in FIG. 1. While not shown in FIG. 2 for simplicity, each stability tube 46 may also include an optional scuttle mechanism at either end, which may help to ensure a more rapid flooding of the stability tubes 46. Such flooding may be desirable when the launch system 50 is to be scuttled after launch.

The launch system 50 of FIG. 2 may optionally include the safety bar 27, for example a T-handle or collar which protects users against an inadvertent release of compressed gas used by the launch system 50 as a propellant, and/or from unforeseen electrical faults from an onboard battery pack 86. The safety bar 27 may be removed concurrently with the positioning of the launch system 50 prior to its deployment. A shipping brace 23 may be connected to the launch system 50 to facilitate handling and further protect the launch system 50. Such structure may be used, for example, in a TDU-launched sonobuoy, and therefore may be fitted to a modified TDU kit to achieve the UAV launch capabilities described herein.

Still referring to FIG. 2, a launch control assembly 54 may be positioned in a housing 35 or other suitable structure, with the launch control assembly 54 shown schematically for illustrative simplicity. The launch control assembly 54 may include a launch trigger mechanism 70, such as a device derived from a standard compressed air quick-release design, from a captive ball bearing interlock, and/or any other launch trigger mechanism such as lanyard activated (i.e., electrically severed) with stored mechanical energy from a spring, a pneumatic actuator, a hydraulic actuator, a solenoid, chemicals sufficient for causing a chemical reaction, etc.

The launch control assembly 54 of FIG. 2 may optionally include a sensor array 55 having a sea water switch 72 operable for confirming that the launch system 50 has properly exited the submarine 11 of FIG. 1 or an aircraft or surface ship and is fully submerged in the body of water 13, and an upper pressure switch 74 operable for confirming that the launch system 50 is presently exposed to hydrostatic pressure. Various other sensors in the array may include respective primary and secondary vertical axis tilt sensors 76 and 78 which together confirm that the launch system 50 has sufficiently rotated so as to become vertically-oriented/upright in the body of water 13 of FIG. 1. Settings for at least some of the sensors may be adjusted wirelessly, e.g., using an infrared link (not shown).

Additional sensors 81 such as accelerometers and/or gyroscope or gyrocompasses may be used to provide information as to the attitude of the launch system 50 while in the TDU hatch of the submarine 11 shown in FIG. 1 and during ascent. A digital or analog timer 82 may be used to ensure a sufficient time delay for the submarine 11 of FIG. 1 to exit the launch area. An inclinometer 84 may be used to establish a stable descent path for the launch system 50. Such sensors are individually well known in the art. The various sensors shown in FIG. 2 may draw electrical power from the battery pack 86, which may be configured as a lithium ion battery or any other suitable energy storage device. A launch release mechanism 88 is also included as explained below.

The launch system 50 of FIG. 2 may drop its secondary ballast and ascend only when all the above sensors have collectively verified that ascent may safely proceed. Various possible means for dropping ballast include cutting a lanyard using a spring loaded or piston-actuated device, thus allowing the secondary ballast to descend to the sea floor under its own weight. Thus, the present system 50 may act according to a string of sensor-tripped safety interlocks, each of which must be unlocked before a launch may proceed.

For example, when the launch system 50 is in storage aboard the submarine 11 a full set of interlocks may be in place. Progressively fewer interlocks may remain as the launch system 50 is placed in a TDU, the TDU closes, the launch system 50 is ejected into the body of water 13 of FIG. 1, the launch system 50 is rotating with a stable descent, and when the submarine 11 is a sufficient distance from the launch area. The setting of the various sensors of the launch control assembly 54 therefore may be calibrated depending on the known size and speed of the submarine 11, the known deployment depth, sea currents, etc.

Referring to FIG. 3, the launch system 50 of FIG. 2 is shown in partial cross-section to show the liquid rocket 80 contained therein. The liquid rocket 80 is launched using a liquid rocket motor/booster assembly 61. The booster assembly 61 operates by rapidly pressurizing a canister 67 having a predetermined volume of liquid 57, e.g., water, to achieve a calibrated mix ratio of the liquid 57 and a supply of compressed gas 59. The compressed gas 59 may be delivered to the canister 67 through a center channel 53 of a launch rail 52 when a control valve 79 opens pressurized gas cylinders 58, thus placing the gas cylinders 58 in fluid communication with the canister 67 above the level of the liquid 57. Optionally, the gas cylinders 58 may be dispensed with if the booster assembly 61 is pre-charged, e.g., by pre-mixing the liquid 57 and gas 59.

The compressed gas 59 passes through the center channel 53 and pressurizes the canister 67. The compressed gas 59 then ejects the liquid 57 through an exhaust nozzle 97 to generate thrust. The nozzle 97 may be opened via an optional device 36, e.g., a collar, latch, or gate, as shown schematically in FIG. 4 for simplicity. The ratio of liquid volume to gas volume is approximately 1:2 in one example embodiment. The initial thrust is in the form of air pressure acting against the launch rail 52, with the second and third phases of thrust being from liquid and residual gas pressure, respectively. The shape and size of the exhaust nozzle 97 allows customization of the thrust profile, and thus controls the acceleration forces imparted on the payload 60.

Within the launch control apparatus 54, the launch release mechanism 88 (see FIG. 2) secures the liquid rocket 80 until the liquid rocket 80 is activated by the launch trigger mechanism 70. The launch trigger mechanism 70 may be controlled by suitable launch electronics as described below, or, optionally, pneumatically. Once the trigger mechanism 70 has been activated, the compressed gas 59 and the liquid 57 can mix together within the canister 67, thus pressurizing the canister 67 to a level sufficient for launching the liquid rocket 80. In an alternative embodiment as noted above, the mixing may be done ahead of time to simplify the operation. Internal pressure within the canister 67 may be directed through the nozzle 97 at a particular launch time, e.g., by opening the nozzle 97 of FIG. 4 via the device 36. This provides thrust in the three distinct phases noted above. The rocket 80 then enters a coast phase and decelerates until reaching apogee.

The optional stability tubes 46, two of which are shown in FIG. 3, can be connected to the launch tube 48. The tubes 46 may be buoyant when the launch system 50 is to be used in water, for instance the body of water 13 of FIG. 1. Such tubes need not be buoyant on land, and may not be needed at all depending on the design, e.g., the weight and size of the UAV payload 60 of FIG. 5. The stability tubes 46 may be replaced with solid tubes, or may be replaced with other suitable structure providing sufficient stability to the launch tube 48, including but not limited to booms, arms, and/or other support/stability members.

Still referring to FIG. 3, the launch tube 48 may define an opening 44 at a first end 45. The launch control assembly 54 may be positioned at a second end 47 of the launch tube 48 to house the various sensors noted above with reference to FIG. 3, as well as secure the launch rail 52. The launch rail 52 axially orients the liquid rocket 80 within the launch tube 48. A cylindrical body 40 of the liquid rocket 80 is circumscribed by a launch tube 48 and contains a UAV payload 60, e.g., a deployable pilotless aircraft, an example of which is shown in FIG. 5 and explained below.

The cylindrical body 40 may define an opening 51 at one end as shown, within which a nose cone 42 may be press-fitted or otherwise securely positioned. Alternatively, the opening 51 may be along the length of the body 40 in a clamshell embodiment rather than a radial opening at the top of the body as shown.

In the embodiment of FIG. 3, the nose cone 42 ultimately separates from the opening 51 when the payload 60 is to be ejected from the liquid rocket 80, and therefore an interface between the nose cone 42 and the body 40 of the rocket 80 may be press-fitted/primarily friction based. The properties of the friction interface can be closely calibrated using the known mass and other physical properties of the UAV payload 60, as well as expected flight dynamics of the liquid rocket 80. In alternative embodiments, the UAV payload 60 may push the nose cone 42 out of the body 40 of the liquid rocket 80 before or after reaching apogee, or the nose cone 42 may be ejected from the body 40 using an actuator (not shown), pyrotechnics, etc.

The booster assembly 61 of FIG. 3 is connected to the liquid rocket 80 at a lower end of the launch tube 48. The booster assembly 61 includes the nozzle 97, and contains initially-separated or pre-mixed volumes of gas and liquid, e.g., a suitable compressed inert gas such as $CO_2$, $N_2$, or air and an inert liquid such as water. The launch control assembly 54 is configured to launch the liquid rocket 80 in response to a received launch signal (arrow 71) from the launch trigger mechanism 70 (see FIG. 2). The launch signal (arrow 71) may be internally generated, for instance using a timer, or may be alternatively transmitted to the launch trigger mechanism 70 of FIG. 2 from a remote source 111, e.g., the submarine 11 of FIG. 1, an aircraft, a surface vessel, or a human operator positioned on the ground.

The launch signal (arrow 71) triggers actuation of the launch release mechanism 88 of FIG. 2. Actuation of the launch release mechanism 88 may include using compressed air (not shown) to pneumatically actuate the valve 79 of FIG. 3. Actuation by any means causes a calibrated mixture of the previously separated volumes of compressed gas and liquid to occur at a predetermined ratio, e.g., 50/50. Pressure rapidly builds in a canister of the booster assembly 61. As exhaust is discharged from the nozzle 97 of the liquid rocket 80, the force of the exhaust pushes against a surface of the launch control assembly 54, which remains stationary and thus acts as a reaction surface. Thus, the rocket 80 moves vertically through the launch tube 48, exits the opening 44, and thereafter is propelled through the air.

The booster assembly 61 initially provides thrust acting on the top of the launch rail 52 until the rocket 80 clears the launch rail 52. This is followed by a liquid thrust phase, a gaseous thrust phase, and a coast phase, the latter of which sees constant deceleration due to gravity until the liquid rocket 80 reaches apogee. As explained below, deployment of the UAV payload 60 from the liquid rocket 80 may occur before, concurrent with, or after reaching apogee depending on the embodiment. In any event, deployment occurs only after the liquid rocket 80 has reached a threshold altitude.

Before or concurrent with the launch, an optional cover (not shown) positioned on end 45 is jettisoned, e.g., blown off using a small charge, ejected using a spring operated device, or simply moved by the mass of the UAV payload 60. Such a cover or other suitable means could be used in any sea-launched embodiment to help maintain the water tightness of the launch tube 48. Because the mixed propellant launches with the liquid rocket 80, this allows for an extended and controlled acceleration of the liquid rocket 80. The liquid rocket approach also helps extend to the effective length of the launch tube 48 without requiring an extension of its actual length, and therefore results in less stress on and potential damage to the UAV payload 60 contained in the liquid rocket 80.

Referring to FIG. 4, when the liquid rocket 80 becomes airborne, exhaust (arrow 30) discharged from the nozzle 97 propels liquid rocket 80 in the direct of arrow 38, typically vertically with respect to the plane of the surface 12 of FIG. 1, although other angles of launch are possible. In a possible embodiment, guide fins 43 may deploy via spring 41, e.g., a leaf spring, spring-loaded hinge, or other suitable device, from the body 40 after the liquid rocket 80 exits the launch tube 48. In such an embodiment the spring 41 may be connected between the guide fins 43 and the body 40 and folded for stowage of the guide fins 43 against the body 40. The number and configuration of guide fins 43 can be selected to provide the liquid rocket 80 with sufficient flight stability.

In one possible embodiment, an optional length of tether 49 as shown in phantom may be attached to the liquid rocket 80 such as at the nozzle 97 and to a stationary portion of the launch system 50. The tether 49 thus arrests the flight of the liquid rocket 80 at a threshold altitude, e.g., a calibrated percentage of apogee, which in one non-limiting embodiment may be at least ⅔ of the rocket's apogee. The inertia of the UAV payload 60 allows the UAV payload 60 to be ejected from the liquid rocket 80. Alternatively, one may forego use of the tether 49 and allow the liquid rocket 80 to reach a percentage of apogee or full apogee, thereafter deploying the UAV payload 60, e.g., by using a mechanical/stored energy payload ejection device (not shown) as the liquid rocket 80 begins its descent after reaching apogee. In another embodiment, the UAV payload 60 may deploy from another portion of the liquid rocket 80, e.g., from the rear, or even from a side in the alternative clamshell design noted above.

Apogee may be at least about 55 m above the surface 12 or other launch surface in an example embodiment in which the liquid rocket 80 weighs approximately 0.6 kg. Maximum velocity of the liquid rocket 80 in this particular embodiment is approximately 35 mps at approximately 3.65 m above the surface 12 (see FIG. 1). Under such constraints, a maximum force of 45 G is placed on the UAV payload 60. In another embodiment, the UAV payload 60 is approximately 0.93 kg and the liquid rocket 80 is approximately 1.2 kg, for a maximum of 30 G. Apogee in this example is at least about 28 m above the surface 12 of FIG. 1, and maximum velocity is approximately 22.8 mps at 2.5 m above the surface 12. Actual flight dynamics and resultant forces will vary depending on the size and mass of the UAV payload 60, the volume/mix of the liquid/compressed gas, geometry of the nozzle 97, and length of the launch rail 52. However, in all embodiments it is expected that the threshold altitude is at least sufficient to clear any immediate surface features such as waves, trees, power lines, buildings, etc. Practically speaking will ordinarily be at least 20 m.

Referring to FIG. 5, an example UAV payload 60 is shown which may be launched within the liquid rocket 80 of FIG. 4. The UAV payload 60 may be shaped like a conventional airplane, i.e., having a fuselage 64, wings 62, a tail section 63, and a nose section 66. The wings 62 may be spring-loaded and/or segmented to allow the wings 62 to sweep and fold parallel to the fuselage 64 for easy insertion into the cylindrical body 40 of the liquid rocket 80 shown in FIG. 4. Thus, once the UAV payload 60 is clear of the body 40, the wings 62 can freely unfold and lock into place. Other embodiments may include wings 62 which wrap circumferentially around the fuselage 64, and then freely unwrap and lock into place when the UAV payload 60 is ejected from the liquid rocket 80.

The UAV payload 60 thereafter may act in whatever manner it is configured, e.g., as a glider, as a remotely piloted vehicle, or an autonomously piloted vehicle. For instance, the nose section 66 may be equipped with a receiver and a flight controller (not shown), and the wings 62 and tail section 63 may be equipped with a rudder, elevators, ailerons, flaps, trim tabs, and/or any other necessary flight control surfaces which may be positioned using commands from the flight controller. The UAV payload 60 may also be equipped with intelligence, surveillance, and reconnaissance (ISR) sensors suitable for capturing and recording/relaying collected intelligence information, for instance electro-optical, infrared, and/or radar imagery, signals intelligence, telemetry information, etc.

Figure 6:
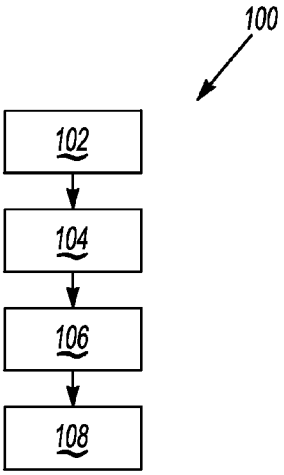
FIG. 6 is a flow chart describing an example method for launching a UAV payload using a liquid rocket.

Referring to FIG. 6, an example method 100 for launching a UAV payload, for instance the UAV payload 60 of FIG. 5 or a suitable alternative embodiment, begins with step 102, wherein a rocket is provided that contains a UAV payload. For example, step 102 may entail providing the liquid rocket 80 of FIG. 4 with the UAV payload 60 shown in FIG. 5. The UAV payload 60 may be positioned in the cylindrical body 40 of the liquid rocket 80 as shown in FIG. 3 with the body 40 configured as explained above.

At step 104, the liquid rocket 80 with its UAV payload 60 encapsulated therein is positioned in a sufficiently stabilized launch tube, for instance the launch tube 48 described herein, either with the various stability tubes 46 shown in FIG. 2 or in another embodiment foregoing the stability tubes 46 in favor of other stabilization elements. The method 100 proceeds to step 106 once the liquid rocket 80 has been positioned.

At step 106, launch of the liquid rocket 80 with the UAV payload 60 contained inside is remotely or directly commanded via the signals (arrow 111) of FIG. 3, thereby causing the compressed gas 59 to travel up the center channel 53 of the launch rail 52 and into the canister 67. The nozzle 97 may be opened once a threshold pressure has built in the canister 67 of FIG. 3, e.g., by opening a valve, collar, or using another suitable actuator, possibly via pneumatic power. The liquid rocket 80 launches through the three phases of thrust described above. Step 106, in a pre-mixed embodiment, may simply entail releasing the pre-pressurized fluids from the booster assembly 61 of FIG. 3 as noted above.

At step 108, the UAV payload 60 is ejected from the body 40 of the liquid rocket 80 at a threshold altitude. The threshold altitude may be above, below, or at apogee, as explained previously hereinabove. Ejection may be facilitated with a tether, e.g., the optional tether 49 of FIG. 4, or via another actuator such as but not limited to a piston, solenoid, latch, or other suitable device for temporarily closing the cylindrical body 40 until deployment, and then opening the body 40. Ejection of the UAV payload 60 may be through an end of the body 40, e.g., through opening 51 of FIG. 3, or a side opening in a clam shell embodiment. Once ejected at altitude free of the extreme forces in proximity to the launch tube 48, the UAV payload 60 unfolds or unwraps its wings 62 (see FIG. 5) and commences flight operations.

While the best modes for carrying out the invention have been described in detail, those familiar with the art to which this invention relates will recognize various alternative designs and embodiments for practicing the invention within the scope of the appended claims.

The invention claimed is:

1. A system for launching an unmanned aerial vehicle (UAV) payload, the system comprising:
   a launch tube;
   a liquid rocket positioned within the launch tube, including:
      a cylindrical body circumscribed by the launch tube when the liquid rocket is positioned within the launch tube;
      a booster assembly connected to the cylindrical body, wherein the booster assembly includes:
      a volume of liquid;
      compressed gas; and
      a UAV payload disposed within the cylindrical body; and
   a launch control assembly positioned with respect to the launch tube, wherein the launch control assembly generates a launch signal which discharges a mixture of the liquid and the compressed gas in different thrust stages to launch the liquid rocket from the launch tube and propel the rocket to the threshold altitude;
   wherein the UAV payload deploys from an opening in the cylindrical body only upon the liquid rocket reaching the threshold altitude.

2. The system of claim 1, wherein the booster assembly includes a canister filled with the volume of liquid, and wherein receipt of the launch signal causes a pressurization of the canister to occur by admitting the compressed gas above a level of the liquid in the canister.

3. The system of claim 1, wherein the volume of liquid and the supply of compressed gas are pre-mixed, and wherein the launch signal causes movement of a latch device to thereby discharge the mixture from the liquid rocket.

4. The system of claim 1, further comprising a plurality of stabilizing tubes surrounding the launch tube.

5. The system of claim 4, wherein the stabilizing tubes are buoyant in water.

6. The system of claim 1, wherein the system is deployable from below a surface of a body of water, and wherein the launch control assembly generates the launch signal only after the system has reached the surface.

7. The system of claim 1, further comprising a tether connected to the liquid rocket that arrests the flight of the liquid rocket at the threshold altitude.

8. The system of claim 1, wherein the liquid is water and the compressed gas is one of compressed nitrogen and compressed carbon dioxide.

9. A system for launching an unmanned aerial vehicle (UAV) payload, the system comprising:
   a launch tube;
   a plurality of stability tubes arranged with respect to the launch tube;
   a liquid rocket including:
      a cylindrical body circumscribed by the launch tube when the rocket is positioned in the launch tube, and defining an opening;
      a booster assembly connected to the cylindrical body, wherein the boost assembly includes a canister containing liquid water;
      a supply of a compressed gas; and
      a UAV payload disposed within the cylindrical body and configured to deploy from the opening in the cylindrical body only when the liquid rocket reaches a threshold altitude; and
   a launch control assembly positioned with respect to the launch tube, wherein the launch control assembly selectively pressurizes the canister by releasing the compressed gas into the launch rail and above a level of the liquid in the canister in response to a launch signal, and discharges the water and compressed gas in multiple thrust stages to thereby launch the liquid rocket from the launch tube and thereafter propel the liquid rocket to the threshold altitude;
   wherein the UAV payload deploys from the opening of the cylindrical body only after the liquid rocket has reached the threshold altitude.

10. The system of claim 9, wherein the compressed gas is compressed carbon dioxide.

11. The system of claim 9, wherein the compressed gas is compressed nitrogen.

12. The system of claim 9, wherein:
   the system is deployable from below a surface of a body of water;
   the system is buoyant so as to rise to the surface after deploying and to thereafter float on the surface; and
   the launch control assembly triggers a release of the compressed gas into the canister only after the system is floating on the surface.

13. The system of claim 12, wherein the system is configured to launch from a trash disposal unit of a submerged submarine, and wherein the system has a length of less than about 42 inches and a dry weight of less than about 23 kg such that the system is compatible with an A-size sonobuoy.

14. The system of claim 9, further comprising a tether connected to the liquid rocket that arrests the flight of the liquid rocket prior to the rocket reaching the threshold altitude.

15. The system of claim 9, wherein the UAV payload has a fuselage and a pair of spring-loaded wings that fold against the fuselage when the UAV payload is positioned in the launch tube.

16. A method of launching an unmanned aerial vehicle (UAV) payload, the method comprising:
   providing a liquid rocket having a body containing a UAV payload and a booster assembly that is connected to the body, wherein the booster assembly includes a supply of liquid and a supply of compressed gas;
   positioning the liquid rocket within a launch tube of a launch system;
   pressurizing the supply of liquid using the compressed gas;
   opening a nozzle of the liquid rocket after pressurizing the supply of liquid to thereby discharge the liquid and compressed gas in different liquid and gaseous thrust stages, thereby launching the liquid rocket to a threshold altitude; and
   ejecting the UAV payload from an opening in the body at the threshold altitude.

17. The method of claim 16, further comprising:
   releasing the compressed gas into a canister containing the liquid above a level of the liquid to thereby pressurize the canister prior to opening the nozzle.

18. The method of claim 16, further comprising:
   deploying the launch system into a body of water; and
   floating the launch system on a surface of the body of water using a plurality of buoyant stability tubes.

19. The method of claim 18, further comprising:
   providing the system with a length of less than about 42 inches and a dry weight of less than about 23 kg such that the system is compatible with an A-size sonobuoy; and
   launching the system from a trash disposal unit of the submerged submarine;
   wherein deploying the launch system into a body of water includes deploying the launch system from a trash disposal unit of a submerged submarine.

20. The method of claim 16, wherein ejecting the UAV payload from an opening in the body at the threshold altitude includes ejecting the UAV at least ⅔ of apogee of the liquid rocket.

* * * * *